(12) United States Patent
Abadi et al.

(10) Patent No.: US 7,577,992 B2
(45) Date of Patent: Aug. 18, 2009

(54) SOFTWARE SECURITY BASED ON CONTROL FLOW INTEGRITY

(75) Inventors: Martin Abadi, Palo Alto, CA (US); Mihai-Dan Budiu, Sunnyvale, CA (US); Ulfar Erlingsson, San Francisco, CA (US); Jay A. Ligatti, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 11/036,121

(22) Filed: Jan. 14, 2005

(65) Prior Publication Data

US 2006/0161978 A1    Jul. 20, 2006

(51) Int. Cl.
G06F 21/22 (2006.01)
G06F 9/44 (2006.01)
G06F 11/30 (2006.01)

(52) U.S. Cl. .................................. 726/22; 713/236

(58) Field of Classification Search ................... None
See application file for complete search history.

(56) References Cited

U.S. PATENT DOCUMENTS

| 5,761,477 | A | | 6/1998 | Wahbe et al. ............... 395/406 |
| 5,974,549 | A | * | 10/1999 | Golan ......................... 726/23 |
| 6,151,618 | A | | 11/2000 | Wahbe et al. .................. 709/1 |
| 7,043,757 | B2 | * | 5/2006 | Hoefelmeyer et al. ......... 726/24 |
| 7,185,368 | B2 | * | 2/2007 | Copeland, III ............... 726/25 |
| 7,337,291 | B2 | * | 2/2008 | Abadi et al. ................. 711/163 |
| 2007/0180526 | A1 | * | 8/2007 | Copeland, III ............... 726/23 |
| 2007/0250703 | A1 | * | 10/2007 | Giraud et al. ............... 713/154 |

OTHER PUBLICATIONS

Abadi et al, "Control-Flow Integrity", Nov. 2005, CCS '05, ACM, p. 1-14.*
KIm et al, "Applying Dataflow Analysis to Detecting Software Vulnerability", Feb. 2008, ICACT 2008, p. 255-258.*
Jo et al, "Constructing Control Flow Graph That Accounts For Exception Induced Control Flows For Java", 2003, Proceedings of the 7th Korea-Russia International Symposium, p. 160-165.*
Schuette et al, "Processor Control Flow Monitoring Using SIgnatured Instruction Streams", Mar. 1987, IEEE Transactions on Computers, vol. C-36, No. 3, p. 264-276.*
Oh et al, "Control-Flow Checking by Software Signatures", Mar. 2002, IEEE Transactions on Reliability, vol. 51, No. 2, p. 111-122.*
Suh, G.E. et al., "Secure Program Execution via Dynamic Information Flow Tracking", *Computer Science and Artificial Intelligence Laboratory(CSAIL)*, 14 pages.
Tabatabai, A.R.A., et al., "Efficient and Language-Independent Mobile Programs", *Proceedings of PLDI, ACM SIGPLAN Conference on Programming Language Design and Implementation*, 1996, 10 pages.

(Continued)

*Primary Examiner*—Christopher A Revak
(74) *Attorney, Agent, or Firm*—Woodcock Washburn LLP

(57) ABSTRACT

Software control flow integrity is provided by embedding identifying bit patterns at computed control flow instruction sources and destinations. The sources and destinations of computed control flow instructions are determined with reference to a control flow graph. The identifying bit patterns are compared during software execution, and a match between a source and a respective destination ensures control flow consistent with the control flow graph. Security measures are implemented when the comparison results in a mismatch, indicating that control flow has deviated from the anticipated course.

17 Claims, 7 Drawing Sheets

OTHER PUBLICATIONS

Tuck, N. et al., "Hardware and Binary Modification Support for Code Pointer Protection from Buffer Overflow", *Proceedings of the 37th International Symposium on Microarchitecture*, Dec. 2004, 12 pages.

Vachharajani, N. et al., "RIFLE: An Architectural Framework for User-Centric Information-Flow Security", *Departments of Computer Science and Electrical Engineering, Princeton University*, 1-12.

Wagner, D. et al., "Mimicry Attacks on Host-Based Intrusion Detection Systems", *CCS*, 2002, 10 pages.

Wagner, D. et al., "Intrusion Detection via Static Analysis", 13 pages.

Wagner, D. et al., "A First Step Towards Automated Detection of Buffer Overrun Vulnerabilities", *University of California, Berkeley*, 15 pages.

Wahbe, R. et al., "Efficient Software-Based Fault Isolation", *Proceedings of the Symposium on Operating System Principles*, 1993, 14 pages.

Wilander, J. et al., "A Comparison of Publicly Available Tools for Dynamic Buffer Overflow Prevention", *10th Network and Distributed System Security Symposium*, 2003, 14 pages.

Xu, J. et al., "Transparent Runtime Randomization for Security", *Center for Reliable and High-Performance Computing Coordinated Science Laboratory*, 10 pages.

"Towards a Solid Base for Dealing with the Next 500 Advanced Code Injection Attacks on C and C++ Programs", 8 pages.

Oh, N. et al., "Control-Flow Checking by Software Signatures", *IEEE Transactions on Reliability*, Mar. 2002, 51(2), 111-122.

Reis, G.A. et al., "SWIFT: Software Implemented Fault Tolerance", http://liberty.princeton.edu/Publications/, Mar. 2005, 12 pages.

Venkatasubramanian, R. et al., "Low-Cost On-Line Fault Detection Using Control Flow Assertions", *Proceedings of the 9th IEEE International On-LineTesting Symposium*, 2003, 7 pages.

Abadi, M. et al., "Asgard: Software Guards for System Address Spaces", Work done at Microsoft Research, Silicon Valley, 14 pages.

De Sutter, B. et al., "Link-Time Binary Rewriting Techniques for Program Compaction", *ACM Transactions on Programming Languages and Systems*, Sep. 2005, 27(5), 882-945.

Necula, G.C. et al., "Safe Kernel Extensions Without Run-Time Checking", *Proceedings of the Second Symposium on Operating Systems and Implementation*, 1996, 229-243.

Necula, G.C., "Proof-Carrying Code", *Proceedings of the 24th Annual ACM SIGPLAN-SIGACT Symposium on Principles of Programming Languages*, 1997, 14 pages.

Abadi, M. et al., "Control-Flow Integrity: Principles, Implementations, and Applications", University of California, Santa, Cruz, Microsoft Research, Silicon Valley, Princeton University, Oct. 26, 2004, 24 pages.

Avijit, K. et al., "TIED, LibsafePlus: Tools for Runtime Buffer Overflow Protection", *Proceedings of the 13th USENIX Security Symposium*, Aug. 9-13, 2004, San Diego, CA, USA, 12 pages.

Baratloo, A. et al., "Transparent Run-Time Defense Against Stack Smashing Attacks", *Proceedings of the 2000 USENIX Annual Technical Conference*, Jun. 18-23, 2000, San Diego, California, 13 pages.

Bhatkar, S. et al., "Address Obfuscation: An Efficient Approach to Combat a Broad Range of Memory Error Exploits", *Proceedings of the 12th USENIX Security Symposium*, Aug. 4-8, 2003, 105-120.

Brumley, D. et al., "Remote Timing Attacks are Practical",i Proceedings of the 12th USENIX Security Symposium, Aug. 4-8, 2003, 1-13.

Chew, M. et al., "Mitigating Buffer Overflows by Operating System Randomization", Fall 1999 @ UC Berkeley, 1-9.

Cowan, C. et al., "PointGuard™: Protecting Pointers from Buffer Overflow Vulnerabilities", *Proceedings of the 12th USENIX Security Symposium*, Aug. 4-8, 2003, 91-104.

Cowan, C. et al., "FormatGuard: Automatic Protection from printf Format String Vulnerabilities", *Proceedings of the 10th USENIX Security Symposium*, Aug. 13-17, 2001, 10 pages.

Crandall, J.R. et al., "Minos: Control Data Attack Prevention Orthogonal to Memory Model", *37th International Symposium on Microarchitecture*, 12 pages.

Drinic', M. et al., "A Hardware-Software Platform for Intrusion Prevention", 10 pages.

Feng, H.H. et al., "Anomaly Detection Using Call Stack Information", *Department of Electrical and Computer Engineering, College of Computing*, 14 pages.

Frantzen, M. et al., "StackGhost: Hardware Facilitated Stack Protection", *CERIAS, Engineering Computer Network*, 11 pages.

Kiriansky, V. et al., "Execution Model Enforcement Via Program Shepherding", *Laboratory for Computer Science*, 10 pages.

Kiriansky, V. et al., "Secure Execution Via Program Shepherding", *Proceedings of the 11th USENIX Security Symposium*, Aug. 5-9, 2002, San Francisco, CA., 17 pages.

Kiriansky, V.L., "Secure Execution Environment via Program Shepherding", Submitted to the Department of Electrical Engineering and Computer Science, Feb. 4, 2003, 1-82.

Kirovski, D. et al., "Enabling Trusted Software Integrity", *ASPLOS*, 2002, 1-13.

Larochelle, D. et al. "Statically Detecting Likely Buffer Overflow Vulnerabilities", *University of Virginia, Department of Computer Science*, 13 pages.

Larson, E. et al., "High Coverage Detection of Input-Related Security Faults", *Proceedings of the 12th USENIX Security Symposium*, Aug. 4-8, 2003, Washington, D.C., 121-136.

McCamant, S. "Verifiable Binary Sandboxing for a CISC Architecture", May 14, 2004, 14 pages.

Nebenzahl, D. et al., "Install-time Vaccination of Windows Executables to Defend Against Stack Smashing Attacks", *Technical Report EES2003-9, School of Electrical Engineering*, Nov. 4, 2003, 17 pages.

Oplinger, J. et al., "Enhancing Software Reliability with Speculative Threads", *ACM*, 2002, 13 pages.

Pincus, J. et al., "Mitigations for Low-Level Coding Vulnerabilities: Incomparability and Limitations", *Microsoft Research*, Jan. 29, 2004, 1-12.

Pincus, J. et al., "Beyond Stack Smashing: Recent Advances in Exploiting Buffer Overruns", *IEEE Computer Society*, 2004, 20-27.

Prasad, M. et al., "A Binary Rewriting Defense against Stack based Buffer Overflow Attacks", *SUNY Stony Brook*, 14 pages.

Provos, N., "Improving Host Security with System Call Policies", *Center for Information Technology Integration*, 15 pages.

Provos, N. et al., "Preventing Privilege Escalation", *Proceedings of the 12th USENIX Security Symposium*, Aug. 4-8, 2003, 231-241.

Richarte, G. et al., "Four Different Tricks to Bypass StackShield and StackGuard Protection", *Core Security Technologies*, Apr. 9, 2002-Apr. 24, 2002, 1 thru 26.

Rinard, M. et al. "Enhancing Availability and Security Through Failure-Oblivious Computing", 10 pages.

Ruwase, O. et al., "A Practical Dynamic Buffer Overflow Detector", *National Science Foundation under Grant #0086160*, 11 pages.

Shacham, H. et al., "On the Effectiveness of Address Space Randomization", May 12, 2004, 17 pages.

\* cited by examiner

| Source | | Destination | |
|---|---|---|---|
| Opcode bytes | Instructions | Opcode bytes | Instructions |
| FF E1 | jmp  ecx | 8B 44 24 04<br>... | mov eax, [esp+4] |
| 81 39 78 56 34 12<br>75 13<br>8D 49 04<br>FF E1 | cmp  [ecx], 12345678h<br>jne    error_label<br>lea    ecx, [ecx+4]<br>jmp  ecx | 78 56 34 12<br>8B 44 24 04<br>... | ; data 12345678h<br>mov eax, [esp+4] |

FIG. 4A

| Source | | Destination | |
|---|---|---|---|
| Opcode bytes | Instructions | Opcode bytes | Instructions |
| FF E1 | jmp  ecx | 8B 44 24 04<br>... | mov eax, [esp+4] |
| B8 77 56 34 12<br>40<br>39 41 04<br>75 13<br>FF E1 | mov eax, 12345677h<br>inc   eax<br>cmp  [ecx+4], eax<br>jne    error_label<br>jmp  ecx | 3E 0f 18 05<br>78 56 34 12<br>8B 44 24 04<br>... | prefetchnta<br>    ds : [12345678h]<br>mov eax, [esp+4] |

FIG. 4B

SOFTWARE SECURITY BASED ON CONTROL FLOW INTEGRITY

CROSS-REFERENCE TO RELATED APPLICATIONS

This application is related to U.S. Pat. No. 7,337,291, entitled "Software Memory Access Control" filed herewith and incorporated by reference in its entirety.

FIELD OF THE INVENTION

The invention generally relates to computing systems and more specifically to protecting computers in such systems from attacks.

BACKGROUND OF THE INVENTION

Computer software may be vulnerable to external attacks that aim to control its behavior. Typically, such attacks arrive as data over a regular communication channel and exploit pre-existing software flaws. By exploiting a flaw, an attack in the form, for example, of a worm or virus may subvert software execution and gain control over software behavior. Worms or viruses may insert themselves into an execution flow of software and divert the flow from the software-planned course to a course dictated by the worm or virus. The software flaw may be at the machine code level, and the attack may divert execution of software machine code, leading to the execution of an unanticipated sequence of machine code instructions.

A typical approach to protecting software against such worms or viruses is to reduce or attempt to eliminate flaws in software coding. A problem with this approach is that it may be very difficult to eliminate all flaws in a piece of software. Other mitigation approaches depend on computer systems independently picking arbitrary values from a large potential set of values, and attempting to surround or convolve important metadata (that an attacker may want to modify) with those arbitrary values—such that the attacker must, for a successful attack, make use of the actual values chosen. These approaches cannot guarantee that the attacker will not learn the chosen values, and may be ineffective if an attacker learns or successfully guesses the chosen value. More broadly, such approaches may not prevent many attacks that may in particular modify machine memory.

Therefore, there is a need for a defense against viruses, worms, and other attacks on computers that is not dependent on the secrecy of arbitrarily chosen values and that can resist attacks that may modify memory.

SUMMARY OF THE INVENTION

The invention provides control flow integrity (CFI) that mitigates vulnerabilities of computer software without requiring the elimination of software flaws, and can prevent an attacker from being successful even when the attacker changes data memory. CFI may restrict the flow of control between machine code instructions that are executing on a computer, constraining the permissible run-time software control flow to remain within a pattern that is identifiable before software execution. The pattern may be identified by a control flow graph (CFG) that maps the control flow of the software. Control flow instrumentation may insert arbitrarily chosen, unique identifying bit patterns (ID) at computed control flow instruction locations identified by the CFG. At a computed jump, for example, an ID may be embedded at the source of the jump, and the same ID may be embedded at the destination of the jump. When the software is running and the computed jump is executed, the IDs at the source and at the destination may be compared and if they match, the computed jump will complete and the software will continue executing. If the IDs at the source and destination do not match, then remedial measures (e.g., notifying the user, stopping the software execution) may commence.

In the event that multiple computed control flow instructions have overlapping destinations, the overlapping destination instructions may be duplicated to prevent an attacker from diverting control flow in an unanticipated manner. Alternatively, more than one ID may be embedded in such manner that, for example, if two sources of a computed jump "land" on the same destination, one of the sources and the destination may have two IDs embedded, with the other source having one of the two IDs embedded. In this way, a match will occur if both of the IDs match for the source with two IDs and if one of the IDs matches for the other source.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings:

FIGS. 4A and 4B depict alternative examples of control flow integrity instrumentation ID-checks, along with example control flow integrity source instruction for use with an x86 processor in accordance with an embodiment of the invention;

DETAILED DESCRIPTION OF ILLUSTRATIVE EMBODIMENTS

Example Computing Environment

Figure 1:
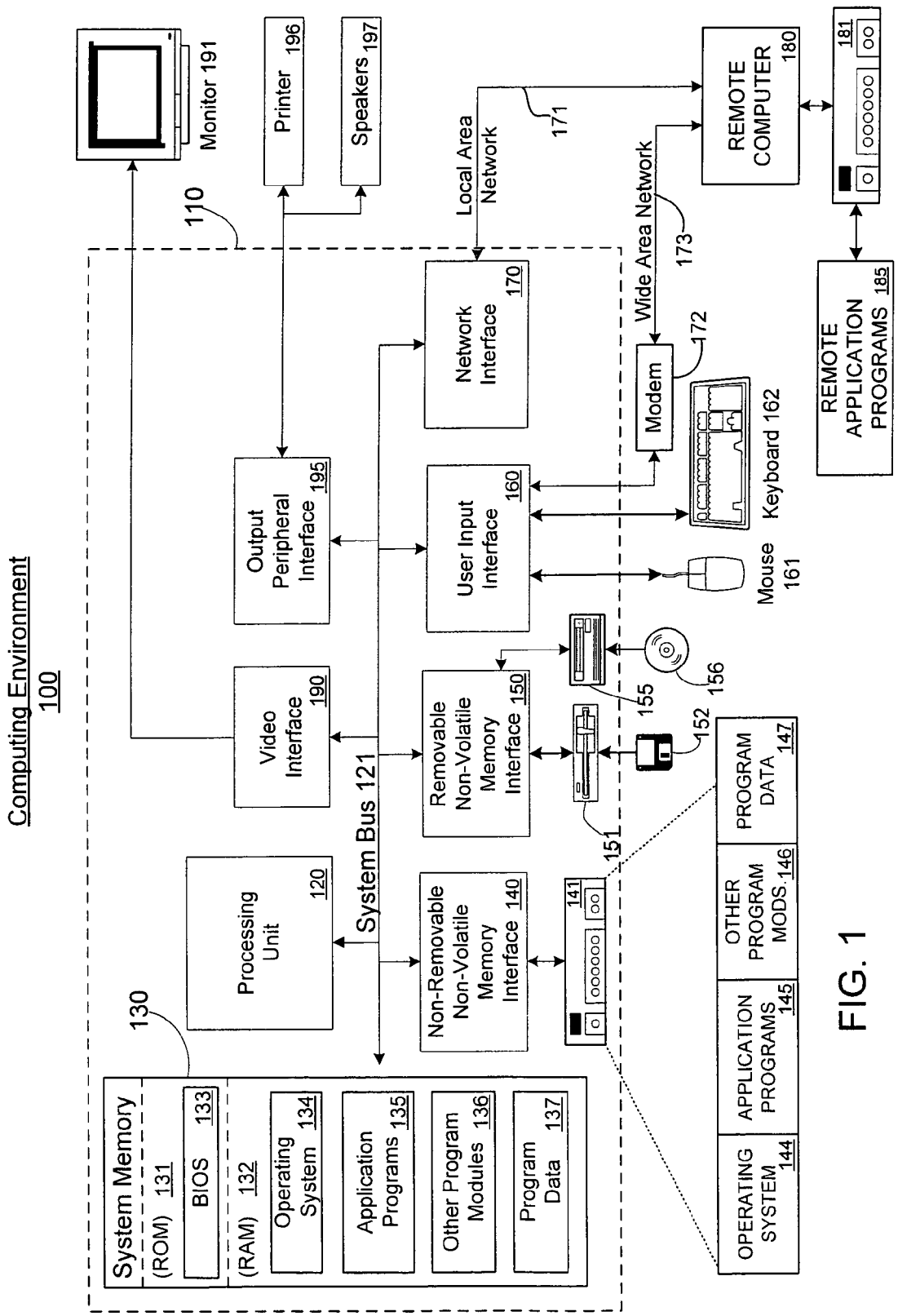
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that hand-held, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Control flow integrity (CFI) in accordance with the invention may provide that during software program execution, control flow machine code instructions target a valid destination. The validity of the destination may be determined by reference to a control flow graph (CFG) created ahead of time pursuant to a control flow analysis. The CFG may be produced, for example, by performing a static control flow analysis on a program. The CFG also may be produced, for example, by a compiler or by a combination of static analysis and a compiler. In addition, the CFG may incorporate control flow restrictions implied by a security policy. The production of the CFG may also rely on dynamic analysis. In addition, the CFG may incorporate control flow restrictions implied by a security policy.

Because most control flow instructions may target a constant destination (encoded as an immediate operand), a CFI requirement may be discharged statically. CFI also may be enforced using a dynamic check that can determine destination validity. This may be desired, for example, in the case of computed control flow instructions (e.g., computed jumps) where a destination may be determined only at runtime. Dynamic checks for enforcing CFI may be added to software by rewriting the software or by instrumentation. CFI instrumentation may modify—according to a given CFG—each computed control flow instruction, or source, and each possible destination of those sources. In particular, a unique identifying bit pattern, or ID, may be inserted at the start of each equivalent destination. Two destinations may be equivalent if the CFG contains edges to both from a single source, and two sources may be equivalent, if, in the CFG, they both target the same destination. Finally, CFI instrumentation may insert before all equivalent sources the code for an ID-check. This ID-check may be a dynamic check that helps ensure that a runtime destination starts with an ID of a proper equivalence class.

Figure 2:
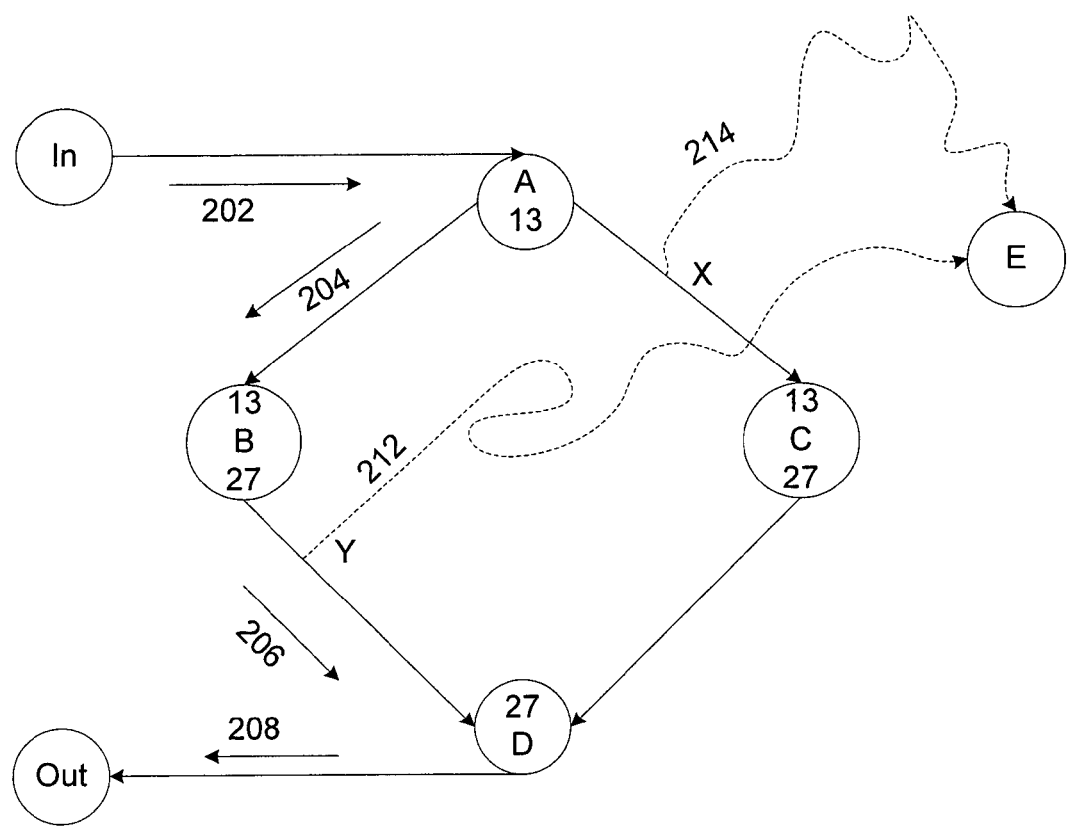
FIG. 2 depicts an example control flow graph with embedded control flow integrity IDs in accordance with an embodiment of the invention.

FIG. 2 depicts an example CFG 200 in accordance with an embodiment of the invention. The CFG 200 may show the anticipated control flow through a software's implementation in machine code. Points A, B, C, and D may each represent a block of machine code to be executed, and the CFG shows the order in which the execution may occur. Many software programs are created by higher level languages that may have a relatively well-defined execution structure such as shown by the example CFG 200. Machine code programs from which higher level language programs are derived may likewise have a well-defined structure, allowing for predicting source and destination during program execution and therefore allowing for generation of informative CFGs.

In the CFG 200, the software control flow may proceed in to point A and out from point D. From point A, the software flow may proceed to point D through either point B or point C. Either path ABD or ACD may be valid, and one path may be chosen for a single execution. The path that may be chosen may only be known at runtime. In FIG. 2, the path that is chosen is shown by arrows 202, 204, 206, 208 as being through ABD. An embodiment of the invention may place a unique identifying bit pattern, or ID, consistent with the CFG 200, at points A, B, C, and D such that the ID assists in constraining the control flow. That is, the ID may act as a check to ensure that the control flow of the software proceeds in an anticipated manner. A bit pattern chosen as an ID may be otherwise absent from code memory except as used in the IDs and ID-checks, after CFI instrumentation. This absence may be achieved, for software, by making the space of the IDs large enough (e.g., 32-bit) and by choosing IDs that do not conflict with the code.

For example, as the control flow proceeds from point A to either point B or D, an arbitrarily chosen ID such as, for example, 13 may be assigned at A. The ID may be chosen randomly or in any arbitrary manner. When the control flow reaches B or C, the ID assigned at B or C should likewise be 13. When the control flow leaves either B or C, an ID assigned upon leaving B or C (e.g., 27) should match the ID at point D.

If the control flow is attacked at either point Y or point X, for example, and the control flow proceeds via path 212 or path 214 to point E, then the ID upon leaving point B (e.g., 27) or point A (e.g., 13) may not find a match at point E. If this occurs, then the software program may halt, show an error, modify behavior, provide a notification, or implement other remedial measures.

Figure 3:
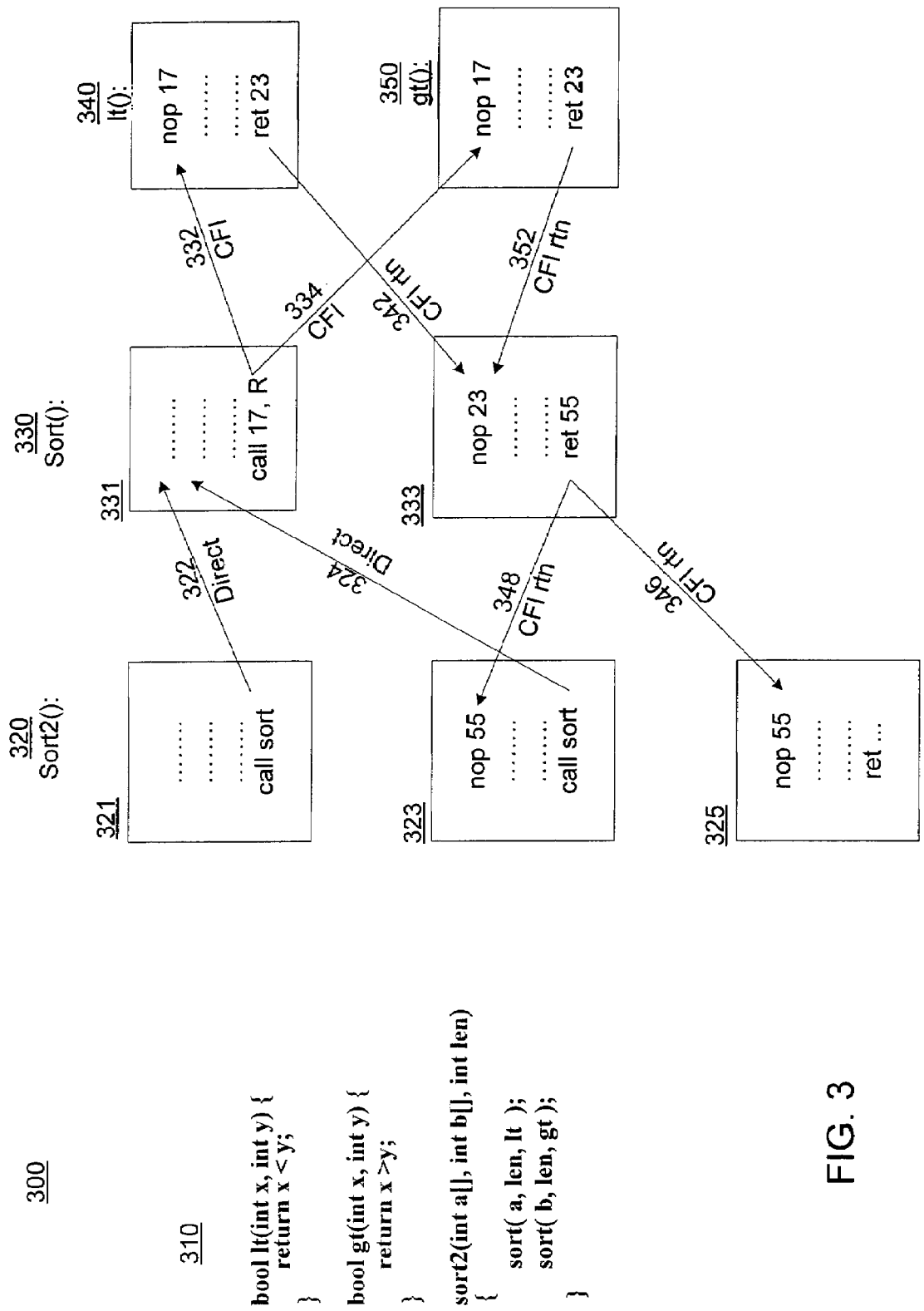
FIG. 3 depicts a flow diagram of an example method for providing control flow integrity in accordance with an embodiment of the invention.

FIG. 3 depicts a flow diagram of an example method 300 for providing control flow integrity in accordance with an embodiment of the invention. The method is demonstrated by reference to a C programming language fragment 310 where a function called "sort2" may call a qsort-like function called "sort" twice, first with less-than ("lt") and then with greater-than ("gt") as a comparison-function pointer. FIG. 3 includes example machine-code blocks for sort 330, sort2 320, lt 340, and gt 350. FIG. 3 shows direct call edges 322, 324, CFI source instruction edges 332, 334, and CFI return edges 342, 352, 346, 348.

Sort 330 may return to two different places 323, 325 in sort2 320. Therefore, CFI instrumentation may add two IDs to the body of sort2 320 called nop 55. The ID constants may be chosen in a way that prevents a computed jump to "chance upon" a valid destination that is different from an intended destination. The IDs may be globally-unique 32-bit values. An ID-check may be performed when returning from sort 330, using nop 55 as an arbitrarily chosen, ID bit pattern. Nop 55 is an instruction that embeds the value 55 and constrains the control flow of the software by prescribing that sort 330 must return to a place in the machine code with a value 55 embedded. Similarly, because sort 330 can call either lt 340 or gt 350, both comparison functions start with an ID nop 17 and a function-pointer call instruction, which uses register R, may perform an ID-check for 17. Finally, an ID 23 may identify a block following the comparison call-site in sort 330, and, thus, both comparison functions may return with an ID-check for 23. If an attacker has diverted the execution path resulting in a failed ID-check, then an attack on the control flow may be identified and addressed. In such a case, the software program may halt, show an error, modify behavior, provide notification, or implement other remedial measures.

It should be noted that FIG. 3 may expose a pattern that may exist when CFI is applied to software compiled from higher-level programming languages. Direct function calls 322, 324 may not be affected by CFI instrumentation. Indirect calls, however, may use an ID-check. Additionally, functions called via a pointer (e.g., virtual methods) may use the addition of an ID. Function returns 342, 346, 348, 352 may account for many ID-checks, and an ID may be inserted after each function call-site, whether that function is called indirectly or not. Remaining computed control flow may be a result of switch statements or exceptions and, for both, an ID may be used at each possible destination and an ID-check at a point of dispatch.

It should be noted that the degree of control flow integrity that is implemented in a system may be controlled. One manner of controlling the degree of control flow integrity is by assignment of the IDs at each computed control flow instruction source and destination. If at each source and destination throughout software, the same ID is used, then any destination containing an ID value may be an appropriate destination for any computed jump, for example. Conversely, if each source contains a different ID value from every other source, and each destination has an ID value matched to only one source, then a high degree of control may be maintained in the control flow integrity of the software. A second manner of controlling the degree of control flow is by inserting the ID values at more and more locations having computed control flow instructions. For more control flow integrity, more locations may have such ID values assigned, and for less control flow integrity, less locations may have the ID values assigned.

Control flow may be constrained pursuant to a CFG in software by, for example, adding machine code instruction to assign IDs in accordance with a CFG. A tool for binary rewriting of code may be used to add the IDs and instructions in existing software code. It should be noted that the code may generally be non-writable code, as used on most current systems, except during the loading of dynamic libraries or runtime code generation.

Control flow may be constrained in hardware as well. FIGS. 4A and 4B depict alternative examples of CFI instrumentation ID-checks along with CFI source instruction for use with an x86 processor. Of course, the x86 processor is discussed for example purposes only and in no way limits the applications for the invention. CFI may be enforced by any mechanism that can mediate machine-code control flow. In particular, the example modified instruction set described with regard to FIGS. 4A and 4B may form the basis for a hardware CFI implementation that would incur zero performance overhead. This CFI support could be added to common processors. In FIGS. 4A and 4B, the source is a computed jump instruction jmp ecx, with a destination of a mov from a stack. Because the destination is in ecx, the ID-checks may not have to move it to a different register, although, in general, ID-checks may do this to avoid a time-of-check-to-time-of-use race condition. Also, the code sequence for the ID-checks may overwrite processor flags; such overwriting may have an effect on program behavior, and may therefore require compensation. The ID used in FIGS. 4A and 4B may be a 32-bit hexadecimal value 12345678, for example.

In FIG. 4A, the ID may be inserted as data before the destination mov instruction, and the ID-check may modify the computed destination using a lea instruction to skip over the four ID bytes. The ID-check may directly compare the original destination with the ID value—which may embed the ID bit pattern within the ID-check cmp opcode bytes. As a result, an attacker may be able to trigger an infinite loop of executing the ID-check opcode bytes 75 through E1, and may, in certain contexts, be able to circumvent CFI altogether.

The code shown in FIG. 4B may avoid the potential problems of the code shown in FIG. 4A regarding infinite loops by using ID—1 as an immediate constant and incrementing it to compute the ID at runtime. Also, the code of FIG. 4B may not modify the computed jump destination but, instead, may insert an effective nop ID at the start of the destination—using a side-effect-free x86 prefetch instruction to synthesize a nop ID instruction that includes the given ID in the appropriate destination location in the code memory.

In an embodiment of the invention, the data may be non-executable. Non-executable data may be supported in hardware, for example on an x86 processor, and operating systems may help enforce a separation between code and data. Non-executable data may also be supported in software. In this way, even if an attacker is able to add or change memory, the code may not allow the additional or changed memory to be used in the code. In the event that data is executable, CFI in accordance with an embodiment of the invention may continue to be used because the ID values may be randomly chosen (in a manner opaque to potential attackers) from a large range of potential values. It therefore may be unlikely that the changed or added memory, such as that introduced by an attacker, would be preceded by exactly the right values when used by the code.

Figure 5:
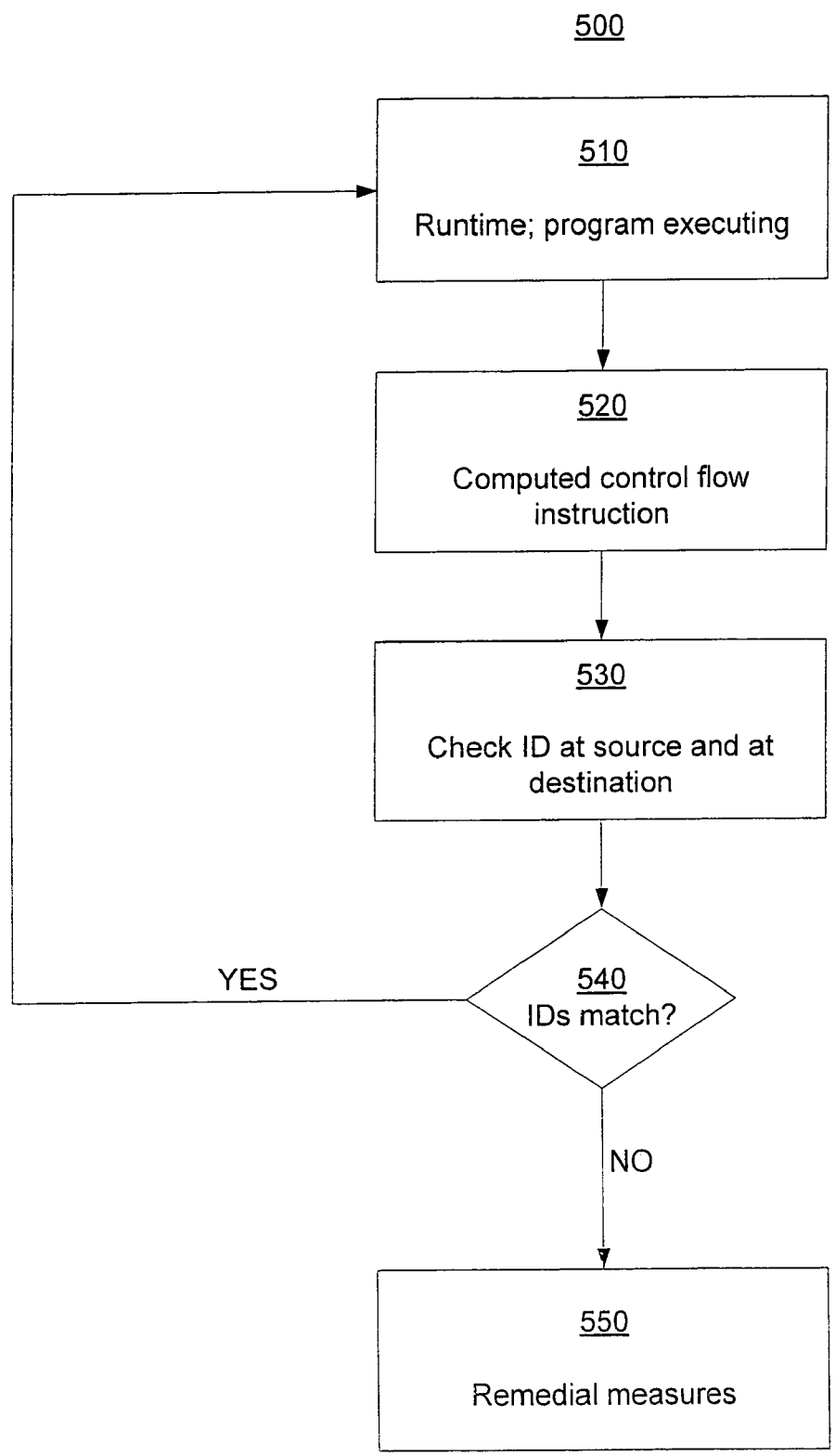
FIG. 5 is a block diagram of an example method for control flow integrity in accordance with an embodiment of the invention.

FIG. 5 is a block diagram of an example method 500 for control flow integrity in accordance with an embodiment of the invention. The method 500 may commence at step 510 during runtime of a software program implementing control flow integrity IDs. The software program may be executing and, at step 520, may come to a computed control flow instruction. Such an instruction may be, for example, a computed jump or a call. At step 530, a check of an ID assigned to a source and an ID assigned to a destination of the computed control flow instruction may be completed. At step 540, the IDs of the source and destination may be compared. If the IDs match, then the software program continues execution. If the IDs do not match, then at step 550, predefined remedial measures may be implemented. Such measures may include halting the program, showing an error, modifying behavior, or providing other notifications.

Figure 6A:
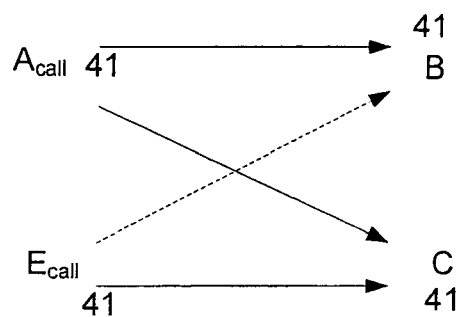
FIGS. 6A, 6B, and 6C depict alternative example methods of implementing control flow integrity on an example control flow graph exhibiting zigzag characteristics in accordance with an embodiment of the invention.
Figure 6B:
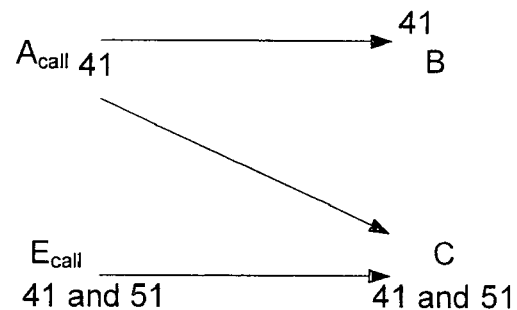
Figure 6C:
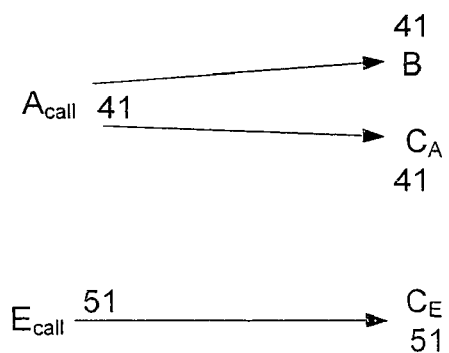

FIGS. 6A-6C depict alternative example methods of implementing CFI pursuant to a CFG exhibiting zigzag characteristics. FIG. 6A shows a CFG with a zigzag characteristics. This characteristic occurs because a function A may call a function B or a function C, and a function E may also call the function C. A dotted line from function E to function B graphically depicts control flow that may be consistent with CFI IDs but is not consistent with the CFG. For example, an ID of 41 may be assigned to the functions A, B, C, E. When the function A calls either functions B or C, the ID of 41 at function A will be compared with the ID of 41 at either functions B or C, and the CFI of the CFG will be maintained. When function E calls function C, the IDs at the source (function E) and the destination (function C) will be compared, and likewise, CFI will be maintained. An attack, however, may be instigated against function E and control flow execution may be diverted such that function E calls function B. Though this call is not consistent with the CFG, a comparison of the IDs at functions E and B will not instigate an alert regarding deviation from the CFG.

There are solutions to this CFG zigzagging problem, and two potential solutions are demonstrated in FIGS. 6B and 6C. A CFG is shown in FIG. 6B in which, as in FIG. 6A, an ID of 41 is embedded at functions A, B, and C, thus providing CFI for the call by function A. With regard to the function E, two IDs may be embedded at the source and destination, for example 41 and 51. CFI consistent with the CFG may be ensured in this way by requiring the comparison to check for both an ID of 41 and an ID of 51. In this way, an attacker trying to divert control flow of function E from function C to function B may fail because an ID of 51 may not be embedded in function B.

FIG. 6C provides an alternative solution to the zigzagging problem exhibited in the CFG of FIG. 6A. In FIG. 6C, the coding for the function C may be copied, that is, duplicated such that the function A may call the function B or a function $C_A$, and function E may call a function $C_E$. A comparison check of the IDs 41 embedded at the source A and destination of B or $C_A$ may ensure CFI, and a comparison of the IDs 51 embedded at functions E and $C_E$ may likewise ensure CFI.

Figure 7A:
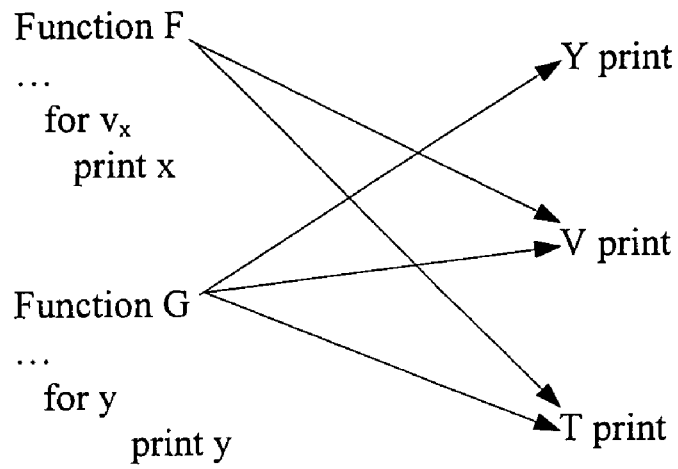
FIG. 7A depicts a control flow graph of example software written in an object-oriented language that also may exhibit control flow zigzag characteristics in accordance with an embodiment of the invention.

FIG. 7A depicts a CFG of example software written in an object-oriented language that also may exhibit control flow zigzag characteristics. The software may include objects v and y, and may have a function F for printing an object x of object v. The function F may call either an object V print or an object T print. The software additionally may have a function G for printing object y, and the function G may call the object V print, the object T print, or the object Y print. Thus, the control flow graph may have zigzagging characteristics, and implementing the control flow integrity IDs may, as described herein, allow an attacker to divert control flow of Function F to the object Y print, contrary to the CFG.

Figure 7B:
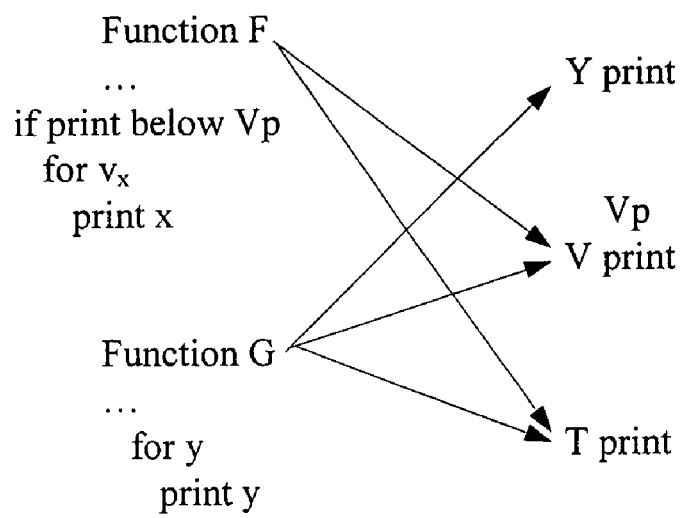
FIG. 7B depicts an example method of providing control flow integrity for the control flow graph depicted in FIG. 7A in accordance with an embodiment of the invention.

FIG. 7B depicts an example method for counteracting the zigzagging characteristics of the CFG depicted in FIG. 7A. The method is based on a principle that the V print and T print objects may be further down in memory than the Y print object. A command may be included in function F stating that print x for $v_x$ may occur if the print object is below a certain place Vp in memory. Additionally, the place Vp may be set in memory below the Y print object, such that the function F may be prevented from being diverted to the Y print object.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A method, when execute by a computer, for thwarting attacks against security of a software system, comprising:

locating in the software a first computed control flow instruction comprising a first source associated with a first destination;

inserting a first identifying bit pattern at the first source;

inserting the first identifying bit pattern at the first destination;

comparing the first identifying bit pattern at the source with the first identifying bit pattern at the destination; and adopting remedial measures when such enforcement encounters a violation of the control flow integrity, wherein the software system comprises software associated with a computer memory, and wherein the control flow integrity is associated with a control flow graph specification.

2. The method of claim 1, wherein enforcing control flow integrity is performed independent of protecting the computer memory.

3. The method of claim 1 wherein locating the first computed control flow instruction is performed with reference to the control flow graph specification.

4. The method of claim 1 further comprising:
locating in the software a second computed control flow instruction comprising a second source associated with the first destination; and
inserting a second identifying bit pattern at the second source.

5. The method of claim 4, further comprising:
inserting the first identifying bit pattern at the second source; and
inserting the second identifying bit pattern at the first destination.

6. The method of claim 4, further comprising:
copying the first destination;
associating the copy of the first destination with the second source;
disassociating the second source from the first destination; and
inserting the second identifying bit pattern at the copy of the first destination.

7. The method of claim 4, further comprising:
inserting a command in at least one of the first and second computed control flow instructions, wherein the command provides that the at least one computed control flow instruction will be executed if the destination associated with the at least one computed control flow instruction is below a reference point in memory.

8. The method of claim 1, further comprising:
executing the software.

9. The method of claim 1, wherein the computed control flow instruction comprises a computed jump.

10. The method of claim 1, wherein the computed control flow instruction comprises a call.

11. The method of claim 1, wherein the computed control flow instruction comprises a return.

12. The method of claim 1, wherein the first identifying bit pattern is written in code memory and the code memory is non-writable at runtime.

13. The method of claim 1, wherein the first identifying bit pattern is embedded as a NOP instruction.

14. The method of claim 1, wherein the software uses data stored in the computer memory, and the data is not otherwise executable.

15. A computer-readable storage medium having computer-executable instructions for performing steps, comprising:
locating in the software a first computed control flow instruction comprising a first source associated with a first destination;
inserting a first identifying bit pattern at the first source;
inserting the first identifying bit pattern at the first destination;
comparing the first identifying bit pattern at the source with the first identifying bit pattern at the destination; and
adopting remedial measures when such enforcement encounters a violation of control flow integrity, wherein the software system comprises software, and wherein control flow integrity is associated with a control flow graph specification.

16. The computer-readable storage medium of claim 15, having further computer-executable instructions for performing the steps of:
locating a second computed control flow instruction comprising a second source associated with the first destination; and
inserting a second identifying bit pattern at the second source.

17. A system for implementing control flow integrity in a computing system, comprising:
means for locating in the software a computed control flow instruction comprising a source associated with a destination;
means for inserting an identifying bit pattern at the source;
means for inserting the identifying bit pattern at the destination;
means for comparing the first identifying bit pattern at the source with the first identifying bit pattern at the destination; and
and means for adopting remedial measures when such enforcement encounters a violation of control flow integrity, wherein the software system comprises software, and wherein the control flow integrity is associated with a control flow graph specification.

* * * * *